(12) United States Patent
Irwin

(10) Patent No.: US 11,007,865 B1
(45) Date of Patent: May 18, 2021

(54) SUPPLEMENTAL TRANSMISSION ASSEMBLY

(71) Applicant: 21 st Green Drive Tech Inc., Bradenton, FL (US)

(72) Inventor: Earl E. Irwin, Bradenton, FL (US)

(73) Assignee: 21 st Green Drive Tech Inc., Bradenton, FL (US)

( * ) Notice: Subject to any disclaimer, the term of this patent is extended or adjusted under 35 U.S.C. 154(b) by 0 days.

(21) Appl. No.: 16/696,484

(22) Filed: Nov. 26, 2019

Related U.S. Application Data

(62) Division of application No. 16/417,073, filed on May 20, 2019, now Pat. No. 10,525,817.

(60) Provisional application No. 62/674,054, filed on May 21, 2018.

(51) Int. Cl.
*B60K 6/50* (2007.10)
*B60K 20/02* (2006.01)
*B60W 20/30* (2016.01)

(52) U.S. Cl.
CPC ............... *B60K 6/50* (2013.01); *B60K 20/02* (2013.01); *B60W 20/30* (2013.01)

(58) Field of Classification Search
CPC .......... B60K 6/50; B60K 20/02; B60W 20/30
USPC .......................................................... 74/664
See application file for complete search history.

(56) References Cited

U.S. PATENT DOCUMENTS

| | | | | |
|---|---|---|---|---|
| 6,176,807 B1 * | 1/2001 | Oba | ...................... | B60W 10/08 477/5 |
| 8,388,494 B2 * | 3/2013 | Schiele | ................. | B60W 20/00 477/5 |
| 9,291,243 B2 * | 3/2016 | Borntraeger | .............. | F16H 1/28 |
| 9,352,738 B2 * | 5/2016 | Kellerman | ............ | B60W 10/10 |
| 10,525,817 B2 * | 1/2020 | Irwin | ...................... | B60K 6/50 |

* cited by examiner

*Primary Examiner* — Ha Dinh Ho
(74) *Attorney, Agent, or Firm* — Smith & Hopen, P.A.; Paul Murty

(57) ABSTRACT

A supplemental transmission assembly including a dual-clutch assembly, a first supplemental input shaft, a second supplemental input shaft, and two independent sets of gears. The supplemental transmission assembly couples to the primary vehicle transmission, receiving rotational energy from the primary transmission output shaft of the primary vehicle transmission. By including a plurality of gears in two independent sets, the supplemental transmission assembly allows the vehicle to smoothly progress through the gears when accelerating or decelerating, providing smooth operation and the maximum fuel efficiency for the vehicle. In addition, the supplemental transmission assembly limits the load on the engine by limiting engine RPMs to less than approximately 2500 RPMs via a computer-controlled engine management system, while progressing through gears quickly and efficiently. Accordingly, the supplemental transmission assembly improves engine and fuel efficiency by providing an intermediary assembly between the primary vehicle transmission and the drive wheels.

2 Claims, 2 Drawing Sheets

SUPPLEMENTAL TRANSMISSION ASSEMBLY

CROSS-REFERENCE TO RELATED APPLICATIONS

This nonprovisional application is a divisional of and claims priority to nonprovisional application Ser. No. 16/417,073, entitled "Supplemental transmission assembly," filed May 20, 2019, which is a continuation of and claims priority to provisional application No. 62/674,054, entitled "Supplemental transmission assembly," filed May 21, 2018 by the same inventor, each of which is incorporated herein by reference.

BACKGROUND OF THE INVENTION

1. Field of the Invention

This invention relates, generally, to a transmission assembly that increases fuel economy and engine efficiency. More specifically, it relates to a supplemental transmission assembly couplable to a vehicle's primary transmission, with the supplemental transmission assembly including up to fourteen or more gears and a dual-clutch system to quickly switch through gears, thereby reducing engine fuel consumption and extending engine life.

2. Brief Description of the Prior Art

To control the power outputted by a vehicle's engine and transferred to the drive wheels, vehicles typically employ a transmission, or drivetrain, assembly. Conventional vehicles typically utilize one of two main transmission types-manual or automatic. Each of the two main transmission types includes different speeds, or gears, that help control engine output to improve engine efficiency. Each of the gears rotates at a different speed, and is coupled to an output shaft which leads to the drive wheels. For example, the first gear is typically the largest in diameter, and rotates at a slower velocity. Each subsequent gear has a smaller diameter, and in turn rotates at a higher velocity. A controller shifts through gears based on the velocity of the vehicle and the revolutions per minute (RPMs) of a crankshaft connected to pistons within the engine. As the RPMs, and consequently the velocity, increase, the vehicle must shift into a higher gear to maintain engine efficiency. By moving up in gears, the output shaft to the drive wheels can rotate at a higher rate, while the crankshaft can rotate at a lower rate, thereby decreasing the RPMs and, consequently, the load on the engine.

In a typical manual transmission assembly (see, e.g., U.S. Pat. No. 8,562,476 for a description of the background of manual transmission assemblies), a user shifts through the gears via a clutch pedal and shifter. The clutch pedal connects to the clutch, which is in mechanical communication with the crankshaft and the gears. The shifter connects to one or more shift forks within the transmission, each of which is connected to at least one gear. The gears are in turn mechanically coupled to an output shaft that connects the engine with the drive wheels, with the drive wheels adapted to rotate at different rates based on the output from the output shaft. When the vehicle is in neutral, none of the gears are mechanically coupled to the output shaft. In first gear, the shift fork engages with the gear having the highest numerical gear ratio, thereby mechanically coupling the first gear with the output shaft. The gear having the highest numerical gear ratio is typically the gear having the largest diameter; gear diameter is determined by the desired gear ratios. When the user depresses the clutch pedal, the clutch disconnects from the gears, thereby temporarily severing the connection between the engine and the gears. The user can then use the shifter to disengage the shift fork from the first gear, and translate the shift fork to engage with the second gear. Then, the user disengages with the clutch pedal, and the engine mechanically couples with the gears again via the clutch.

In a typical automatic transmission assembly (see, e.g., U.S. Pat. No. 4,987,792 for a description of the background of automatic transmission assemblies), the clutch system is removed and replaced with a torque converter. The torque converter provides a fluid coupling between the engine and the output shaft of the transmission, which ultimately mechanically couples with the drive wheels to control the revolution speed thereof. Different gear ratios can be accomplished through the application of different clutch packs and planetary gear systems which, based on the velocity of the vehicle, which allows the vehicle to change between gears without the need for a user to depress a clutch or translate a shifter.

Some small engine vehicles may successfully use continuously variable transmissions (CVTs), an example of which is described in U.S. Pat. No. 4,881,925. A CVT allows a vehicle to almost unnoticeable shifting between gears, and near-infinite gear ratios. To accomplish this, the CVT utilizes an input pulley connected to an output pulley via a belt. Each pulley has an associated effective diameter, based on the overlap between the belt and the pulley, with the effective diameter being used to determine the rotational speed of the belt. For example, at lower speeds, the input pulley has a small effective diameter and the output pulley has a large effective diameter, with the majority of the belt being mechanically coupled to the output pulley. As speed increases, the input pulley increases in diameter, and the output pulley decreases in diameter, allowing the output pulley to rotate at a higher rate. CVTs allow for a vehicle to easily adjust gear ratios by adjusting the diameters of the input and output pulleys, providing a smooth transition between many different variable gear ratios.

Alternatively, some modern transmissions employ a dual-clutch system, which offers many of the benefits of each of manual and automatic transmissions, and which uses constant mesh gears similar to motorcycle transmissions. An example of a dual-clutch transmission assembly is described in U.S. Pat. No. 4,461,188. In a dual-clutch transmission, two sets of gears are connected to the output—one set for the odd-numbered gears, and another set for the even-numbered gears. The dual-clutch alternatively engages with both sets of gears, while only one gear is mechanically coupled to the output at a given time. Since the dual-clutch alternatively engages with each set of gears, the vehicle can shift from $1^{st}$ gear to $2^{nd}$ gear without any noticeable loss in power, as would be experienced in a manual transmission, because there is no need for a manual clutch. Instead, the dual-clutch simply and quickly decouples the $1^{st}$ gear from the output, and couples the $2^{nd}$ gear to the output. Accordingly, the vehicle drives as if it has an automatic transmission installed. However, because the vehicle is not truly automatic, there is no need for a torque converter, which causes slippage and heat loss in an automatic transmission. Instead, the dual-clutch system utilizes a flywheel to prevent slippage upon gear-shifting, thereby reducing heat loss and increasing engine and fuel efficiencies. While there is no need for a torque converter, some dual-clutch systems include a torque converter to improve vehicle operation at very low speeds.

While CVTs and dual-clutch systems have been introduced to improve fuel efficiency by making the transition between gears smoother, existing systems are limited by the efficiency of the 5-speed, 6-speed, 7-speed, 8-speed, 9-speed, or 10-speed systems employed by traditional transmissions. Accordingly, what is needed is a supplemental transmission that may employ a dual-clutch system to switch between gears in approximately five miles per hour (mph) increments, allowing the transmission to shift between gears smoother, quicker, and more efficiently than in existing systems. In addition, what is needed is a dual-clutch transmission that allows for non-sequential gear-shifting while remaining smooth and efficient in practice. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a supplemental transmission assembly is now met by a new, useful, and nonobvious invention.

The novel structure includes a supplemental transmission assembly, including a dual-clutch assembly, in mechanical communication with a primary vehicle transmission via an input shaft. The supplemental transmission assembly is also in mechanical communication with one or more vehicle drive wheels via a supplemental output shaft coupled to a differential. As such, the supplemental transmission assembly is adapted to receive energy from the primary (or original) vehicle transmission and transmit the received energy to the one or more drive wheels. To provide for smooth shifting between gears at increasing and decreasing speeds, the supplemental transmission assembly includes a first supplemental input shaft and a second supplemental input shaft. Each of the first and second supplemental input shafts is in mechanical communication with the supplemental output shaft to the one or more vehicle drive wheels. The first supplemental input shaft is in mechanical communication with a first set of gears, with each of the gears in the first set being capable of rotating the supplemental output shaft based on a rotational speed of the input shaft. Similarly, the second supplemental input shaft is in mechanical communication with a second set of gears, with each of the gears in the second set being capable of rotating the supplemental output shaft based on the rotational speed of the input shaft.

An intermediary gear reduction unit may be disposed at a first end of the supplemental transmission assembly adjacent to the mechanical communication between the dual-clutch assembly and the primary vehicle transmission. The intermediary gear reduction unit is configured to connect the supplemental transmission assembly to the initial output shaft of the vehicle transmission. The unit may be encased within an adapter housing to aid in fitting the supplemental transmission assembly to the primary vehicle transmission. The intermediary gear reduction unit includes one or more rotatable members having an angular radius greater than an angular radius of the primary transmission output shaft, such that the one or more rotatable members are configured to receive energy from the primary transmission output shaft, decrease an angular velocity of the primary transmission output shaft, and transfer the received energy to the first and second supplemental input shafts. An intermediary rotatable shaft couples the intermediary gear reduction unit to the supplemental transmission assembly.

A plurality of shift forks in mechanical communication with the first supplemental input shaft, as well as the second supplemental input shaft. The plurality of shift forks are couplable to the first and second set of gears, depending on the speed of the vehicle. Since the supplemental transmission assembly is designed as a dual-clutch system, the first set of gears corresponds to odd-numbered gears and the second set of gears corresponds to even-numbered gears, such that the plurality of shift forks alternatively engage with the first and second sets of gears.

An object of the invention is to provide a supplemental transmission assembly that couples with a primary vehicle transmission to provide for quicker and smoother transitions between gears while shifting, limits engine load by reducing the RPMs needed to rotate the input and output shafts, and includes a plurality of gears to allow for the quick and efficient shifting between gears, thereby improving engine and fuel efficiency.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a supplemental transmission assembly that couples with and receives energy from the transmission output shaft of the primary vehicle transmission. As such, the supplemental transmission assembly indirectly receives energy from the vehicle's engine, and transfers the energy to the vehicle's drive wheels. The supplemental transmission assembly is adapted to work in conjunction with the primary vehicle transmission as an intermediary gearbox that mechanically couples with the drive wheels. In addition, the supplemental transmission assembly is a dual-clutch system having a plurality of gears, allowing for the smooth transition between gears while increasing or decreasing engine RPMs. The supplemental transmission assembly provides for more efficient gear-shifting, minimizes engine RPMs to thereby decrease the load on the engine, and consequently increases vehicle fuel efficiency.

Figure 1:
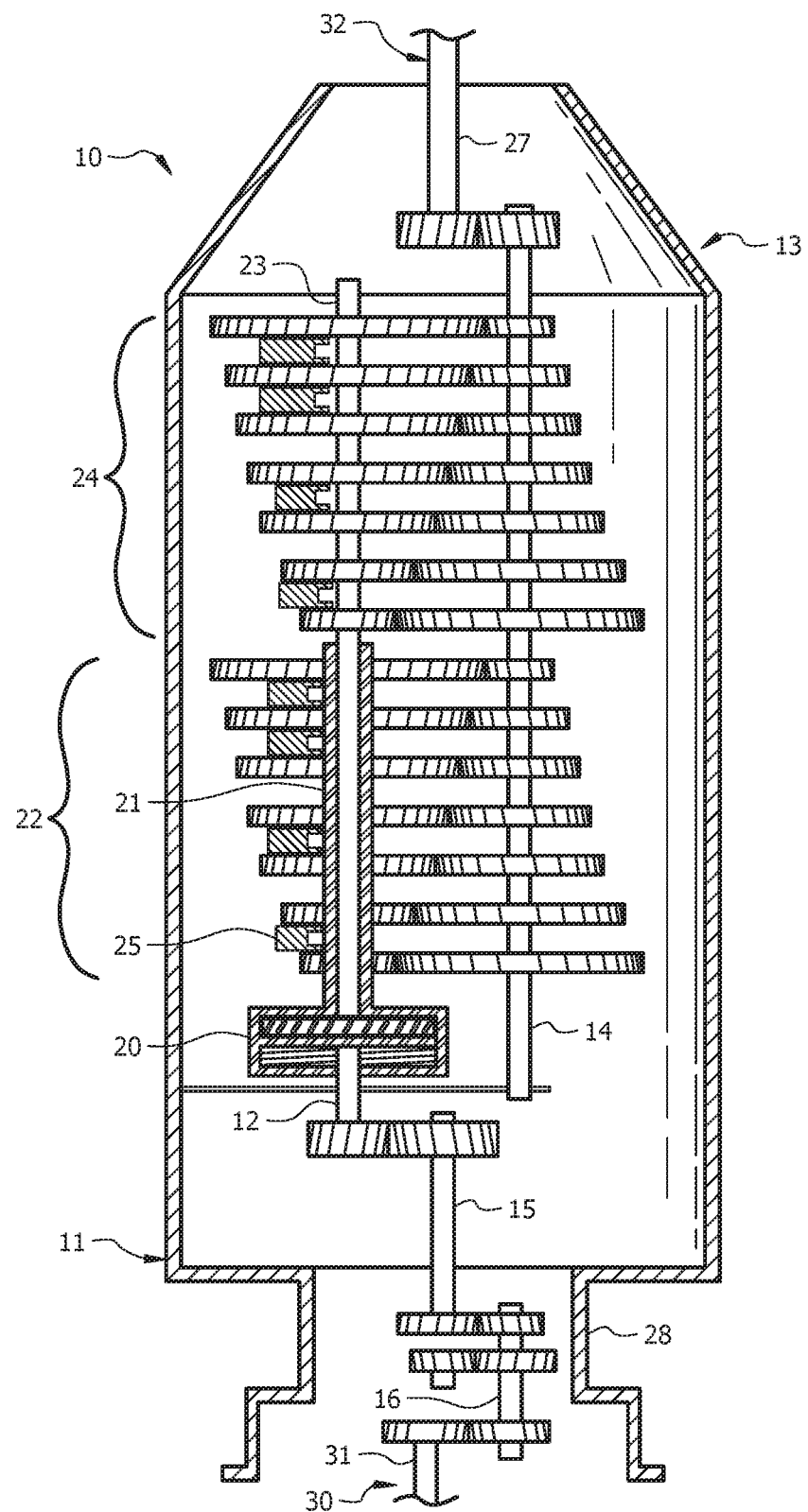
FIG. 1 is an orthogonal view of a supplemental transmission assembly.

As shown in FIG. 1, supplemental transmission assembly 10 includes first end 11 opposite second end 13, with first end 11 being coupled to the primary transmission output shaft 31 of the primary vehicle transmission (the primary, or original, vehicle transmission being denoted by reference numeral 30 but not shown in FIG. 1), and second end 13 being coupled to the drive wheels (denoted by reference numeral 32 but not shown in FIG. 1) via driveshaft 27, which is in communication with supplemental transmission assembly 10. As such, supplemental transmission assembly 10 is adapted to receive energy from primary vehicle transmission 30 via the rotation of primary transmission output shaft 31, and transfer that energy to drive wheels 32 after passing through supplemental transmission assembly 10. By passing the rotational energy from primary transmission output shaft 31 through supplemental transmission assembly 10, the final output to drive wheels 32 via driveshaft 27 can be managed and controlled to provide for smoother transitions between gears while the vehicle increases or decreases in velocity. In addition, the output to drive wheels 32 may be accomplished through a set of constant velocity (CV) joints that directly or indirectly couple to the drive wheels, providing a flexible and reliable connection between driveshaft 27 and drive wheels 32. It is contemplated that driveshaft 27 may be indirectly coupled to drive wheels 32 via a differential assembly, which is not shown in the figures but is known within the art.

An intermediary gear reduction unit 15 indirectly couples supplemental transmission assembly 10 with primary vehicle transmission 30. Gear reduction unit 15 includes a series of rotatable members 16 that receive rotational energy from primary vehicle transmission 30. Since the effective diameter of gear reduction unit 15 is greater than that of primary transmission output shaft 31, gear reduction unit 15 allows for the control of rotational velocity that passes into supplemental transmission assembly 10. Said another way, gear reduction unit 15 (including rotatable members 16) includes an angular radius greater than an angular radius of primary transmission output shaft 31, such that gear reduction unit 15 decreases an angular velocity of primary transmission output shaft 31. As such, gear reduction unit 15 allows supplemental transmission assembly 10 to include more gears (and thereby more gear ratios) than primary vehicle transmission 30, thereby providing more engine efficiency as the engine RPMs are limited.

After the rotational velocity is slowed through gear reduction unit 15, intermediary rotatable shaft 12 receives the rotational energy and transfers the energy to dual-clutch assembly 20. Dual-clutch assembly 20 is similar to other dual-clutch assemblies described in the prior art, including first supplemental input shaft 21 and second supplemental input shaft 23. Each of the first and second supplemental input shafts 21, 23 are mechanically coupled to intermediary rotatable shaft 12 via dual-clutch assembly 20. As shown in FIG. 1, in an embodiment, second supplemental input shaft 23 may be disposed within a central channel of first supplemental input shaft 21; alternatively, first supplemental input shaft 21 may be disposed within second supplemental input shaft 23, or the supplemental input shafts may be separated by a distance while remaining in communication with primary transmission output shaft 31. In addition, each of the first and second supplemental input shafts 21, 23 are mechanically coupled to drive wheels 32 via supplemental output shaft 14 and driveshaft 27. The first and second supplemental input shafts 21, 23, supplemental output shaft 14, and driveshaft 27 are adapted to be parallel to each other along a longitudinal axis of supplemental transmission assembly 10, from first end 11 to second end 13. Moreover, first supplemental input shaft 21 includes first set of gears 22 coupled thereto, and second supplemental input shaft 23 includes second set of gears 24 attached thereto. Each gear in first set and second set 22, 24 has a different gear ratio, and couples with a complementary gear on supplemental output shaft 14, thereby allowing the first and second supplemental input shafts 21, 23 to transfer rotational energy to supplemental output shaft 14. The lower gears have numerically-higher gear ratios, and the higher gears have numerically-lower gear ratios, meaning that the lower gears provide lower rotational velocity, and the higher gears provide higher rotational velocity. By switching through the gears, the load on the vehicle's engine is maintained at a steady and manageable rate to increase fuel efficiency.

To change between gears, supplemental transmission assembly 10 includes a plurality of shift forks 25. Each of shift forks 25 is adapted to connect with one or more of the gears in one of the sets of gears 22, 24. As shown in FIG. 1, shift fork 25 disposed between the first and third gears is adapted to separately connect with each of the gears, depending on the needs of the vehicle. For example, as the vehicle begins accelerating, shift fork 25 connects with the first gear, which has the smallest diameter and therefore produces the slowest rotational velocity on supplemental output shaft 14. When the vehicle is ready to move into third gear, shift fork 25 connects with the third gear via a sliding mechanism controlled by a solenoid-type device. To provide a smooth transition to the third gear, shift fork 25 translates via the solenoid-type device to connect to the third gear while the vehicle is still engaged with the second gear, similar to a traditional dual-clutch system. While sequential gear shifting can occur, similar to traditional transmissions, non-sequential gear-shifting can occur to allow for quick accelerations and decelerations due to the low RPMs maintained by the engine. Said another way, because there is not much of a mile-per-hour difference between non-sequential gears, down-shifting or up-shifting in a non-sequential manner will be possible due to the lesser torque-requirement differences between non-sequential gears. While park, reverse, and neutral gears are not shown in the figures, it is appreciated that supplemental transmission assembly 10 may include additional gears, shift forks, and mechanisms to provide for park, reverse, and neutral gears.

By providing supplemental transmission assembly 10 having a plurality of gears, the engine load can be further managed to prolong engine life and increase engine performance and efficiency. Instead of only having five or six gears, FIG. 1 shows that supplemental transmission assembly 10 can include up to fourteen gears or more, and can include more or less gears depending on the needs of the vehicle. As such, when the engine increases in RPMs during acceleration, supplemental transmission assembly 10 quickly progresses through the gears to prevent the RPMs from getting too high and thereby increasing fuel consumption or increasing the load on the engine. Similarly, during deceleration, supplemental transmission assembly 10 can quickly move down in gears, similarly preventing engine damage by lugging. As a result, primary vehicle transmission 30 and supplemental transmission assembly 10 together can progress through gears without the engine experiencing higher than approximately 2,500 RPMs. In addition, the switching of gears occurs in approximately five mph increments, allowing vehicle occupants to enjoy a smooth, efficient, and seemingly seamless ride even through the switching between gears, with the gear changes taking place in under approximately forty milliseconds or less, as is common in traditional dual-clutch systems. The control over the gear progression may reside in a computer-controlled engine management system, such as an engine control unit (ECU) typically found on modern vehicles that is in communication with the engine, transmission, sensors, and other components of the vehicle.

In vehicles with more complex computing units installed therein, the speed of the vehicle, as well as the shifting between gears, can be preset and dictated by the computing units. GPS units can be used to read stored speed limits via a computing database, and use the stored data to determine whether and a when a gear shift should occur. In particular, these aspects of supplemental transmission assembly 10 may provide advantages for large transportation vehicles and fleets, to conserve fuel, extend engine service limits, maintain safe vehicle operation and speed, and benefit drivers by undertaking some of the more traditional driver responsibilities.

An advantage of supplemental transmission assembly 10 is that, in addition to being built into newly-manufactured vehicles, the assembly may be fit or retrofit onto existing vehicles. As such, the cost of installation is much lower if the assembly can be fit, retrofit, or otherwise coupled to an existing vehicle, providing consumers and service providers with the option of adding supplemental transmission assembly 10 to improve fuel and engine economy. The assembly may be installed on an existing vehicle by coupling onto the tail shaft section of primary vehicle transmission 30 via an adapter, the housing of which is denoted by reference numeral 28 in FIG. 1. Adapter housing 28 includes gear reduction unit 15, as discussed above, and mechanically couples supplemental transmission assembly 10 to primary transmission assembly 30. As such, instead of primary vehicle transmission 30 being directly coupled to drive wheels 32, supplemental transmission assembly 10 provides an intermediary assembly between the components.

While FIG. 1 depicts the components of supplemental transmission assembly 10 in an open configuration, it is appreciated that the components may be housed within an enclosed body. For example, adapter housing 28 may enclose the internal components thereof, and may include an aperture, through which primary transmission output shaft 31 of primary vehicle transmission 30 couples with supplemental transmission assembly 10. Similarly, driveshaft 27 may exit supplemental transmission assembly 10 to drive wheels 32 through an aperture formed in an enclosure at second end 13 of supplemental transmission assembly 10.

Figure 2:
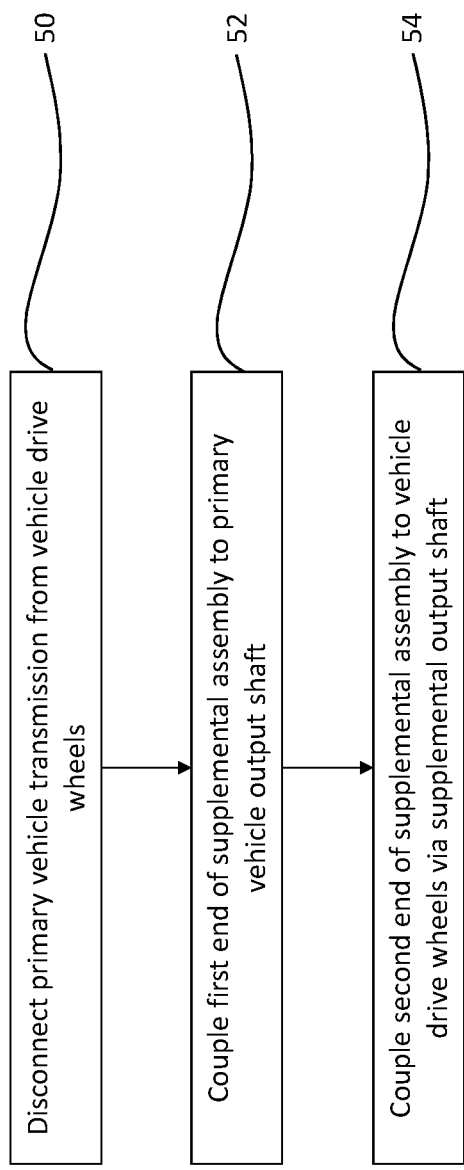
FIG. 2 is a process flow diagram depicting a method of fitting a supplemental transmission assembly on a vehicle, in accordance with an embodiment of the present invention.

FIG. 2 is a process-flow diagram depicting a method of installing a supplemental transmission assembly by fitting, retrofitting, or otherwise coupling the supplemental transmission assembly to the primary vehicle transmission. FIG. 2 is described in combination with the components shown in FIG. 1 and discussed in greater detail above. It is appreciated that the steps delineated in FIG. 2 may be performed in a singular step or in multiple steps, and may include fewer or more steps than delineated in FIG. 2. Moreover, it is appreciated that the assembly need not be coupled to an existing unit, and may be installable on a new vehicle without requiring a fitting, retrofitting, or other coupling process.

As shown in FIG. 2, the method includes step 50, during which primary vehicle transmission 30 is disconnected from vehicle drive wheels 32. After the mechanical connection between primary vehicle transmission 30 and vehicle drive wheels 32 is severed, supplemental transmission assembly 10 is installed to be in mechanical communication with each of primary vehicle transmission 30 and vehicle drive wheels 32 during steps 52 and 54. Specifically, during step 54, first end 11 of supplemental transmission assembly 10 is mechanically coupled to primary transmission output shaft 31 of primary vehicle transmission 30. Similarly, during step 54, second end 13 of supplemental transmission assembly 10 is mechanically coupled to vehicle drive wheels 32 via supplemental output shaft 14, which in turn may secure to driveshaft 27. Accordingly, supplemental transmission assembly 10 is coupled as an intermediary between primary vehicle transmission 30 and vehicle drive wheels 32, such that first supplemental input shaft 21 and second supplemental input shaft 23 control the ultimate energy transferred to vehicle drive wheels 32 via supplemental output shaft 14. To aid in the fitting process, first end 11 of supplemental transmission assembly 10 may be disposed within adapter housing 28, which may include reciprocal fittings to connect to commonly used sizes of primary transmission output shaft 31, depending on the manufacturer of the vehicle.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

What is claimed is:

1. A method of shifting through a plurality of gears on a vehicle using a supplemental transmission assembly, the method comprising the steps of:
  disconnecting a primary vehicle transmission from one or more vehicle drive wheels;
  mechanically coupling a first end of a supplemental transmission assembly to a primary transmission output shaft of the primary vehicle transmission, thereby mechanically coupling a first supplemental input shaft and a second supplemental input shaft of the supplemental transmission assembly to the primary transmission output shaft of the primary vehicle transmission, the first supplemental input shaft including a first set of gears and the second supplemental input shaft including a second set of gears;

mechanically coupling a second end of the supplemental transmission assembly to the one or more vehicle drive wheels via a supplemental output shaft, the supplemental output shaft including a complementary set of gears that is in mechanical communication with each of the first set of gears of the first supplemental input shaft and the second set of gears of the second supplemental input shaft;

simultaneously connecting at least one of a plurality of shift forks to the first set of gears and at least one of the plurality of shift forks to the second set of gears;

receiving, at the first supplemental input shaft and the second supplemental input shaft, a rotational output from the primary vehicle transmission via the primary transmission output shaft; and based on the rotational output, via the plurality of shift forks, shifting through the first set of gears and the second set of gears of the supplemental transmission assembly as the vehicle accelerates and decelerates.

2. The method of shifting through the plurality of gears on the vehicle using the supplemental transmission assembly of claim 1, further comprising a step of:

disposing the first end of the supplemental transmission assembly within an adapter housing configured to connect the supplemental transmission assembly to the primary transmission output shaft of the primary vehicle transmission.

* * * * *